United States Patent

Rybicki et al.

[11] 4,142,833
[45] Mar. 6, 1979

[54] ELASTOMERIC BEARING FOR HELICOPTER ROTOR

[75] Inventors: Robert C. Rybicki, Trumbull, Conn.; Brian Cuerden, Brockenridge, Pa.

[73] Assignee: United Technologies Corporation, Hartford, Conn.

[21] Appl. No.: 785,995

[22] Filed: Apr. 8, 1977

Related U.S. Application Data

[63] Continuation-in-part of Ser. No. 628,295, Nov. 3, 1975, abandoned.

[51] Int. Cl.² ..................... B64C 27/38; F16C 9/00
[52] U.S. Cl. ............................. 416/134 A; 308/26; 416/141
[58] Field of Search ............... 416/134, 134 A, 141; 308/2 R, 237, 26; 267/57.1

[56] References Cited

U.S. PATENT DOCUMENTS

| | | | |
|---|---|---|---|
| 3,083,065 | 3/1963 | Hinks et al. | 308/237 |
| 3,228,673 | 1/1966 | Hinks | 267/57.1 |
| 3,759,631 | 9/1973 | Rybicki | 416/134 A |
| 3,862,812 | 1/1975 | Gorndt et al. | 416/141 |
| 3,941,433 | 3/1976 | Dolling et al. | 308/2 R |
| 4,040,690 | 8/1977 | Finney | 416/141 X |

FOREIGN PATENT DOCUMENTS

| | | | |
|---|---|---|---|
| 934336 | 5/1948 | France | 416/134 |
| 497790 | 11/1937 | United Kingdom | 416/134 |
| 823521 | 11/1959 | United Kingdom | 416/134 |

OTHER PUBLICATIONS

"Elastomeric Bearing Application to Helicopter Tail Rotor Designs", by C. H. Fagan–paper presented at American Helicopter Society Southwest Region Tech. Meeting on: Jan. 25, 1968.

*Primary Examiner*—Everette A. Powell, Jr.
*Attorney, Agent, or Firm*—Vernon F. Hauschild

[57] ABSTRACT

An elastomeric bearing for a helicopter rotor in which the laminates of the bearing are shaped and positioned so that the center of hydrostatic pressure generated in each elastomer laminate and the cross-sectional center of gravity of each metal laminate are in alignment so that the integrated load vectors reacted through the metal and elastomer laminates of the bearing in imparting blade centrifugal loads to the hub therethrough are substantially in alignment to thereby prevent the creating of eccentric internal moments and hence avoid life reducing bending and hoop stresses in the metal laminates and unnecessarily high hydrostatic pressures in the elastomer laminates.

7 Claims, 10 Drawing Figures

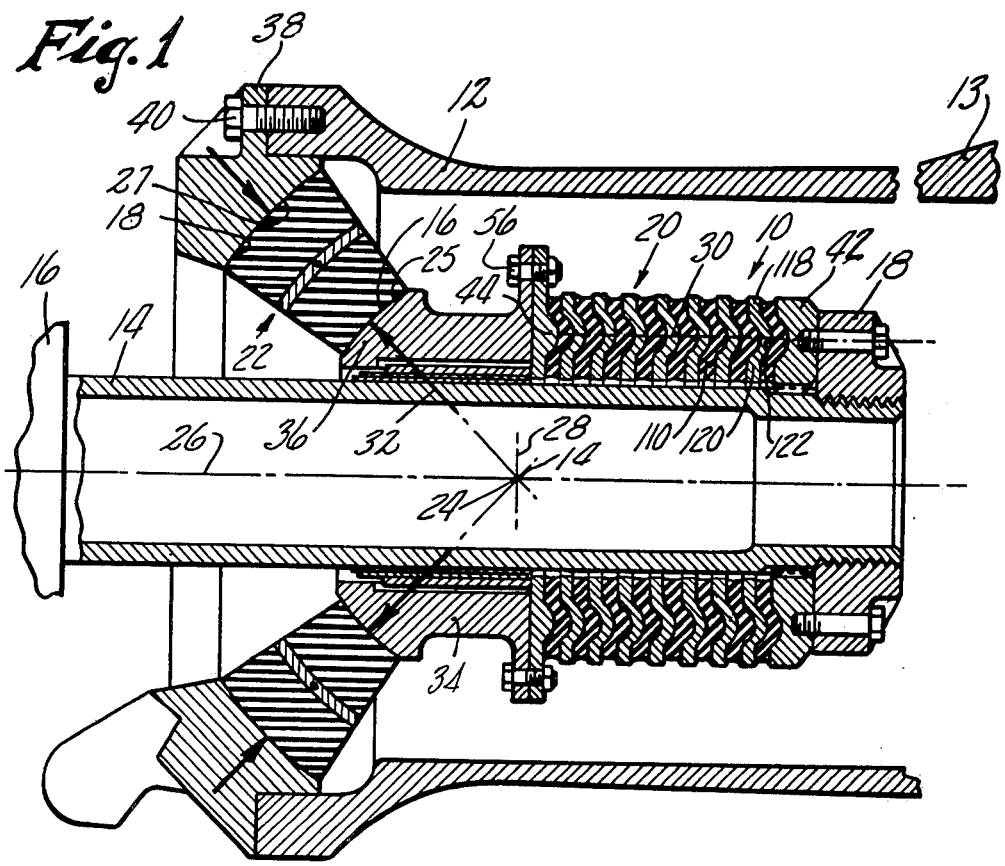
Fig. 1
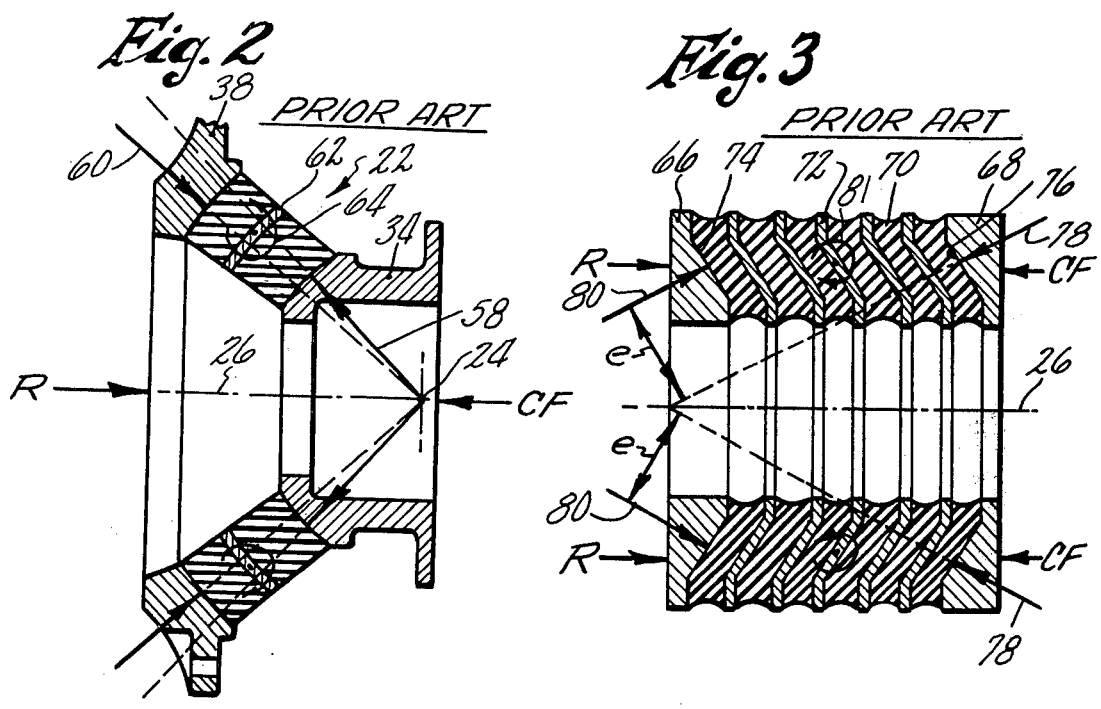
Fig. 2 PRIOR ART
Fig. 3 PRIOR ART

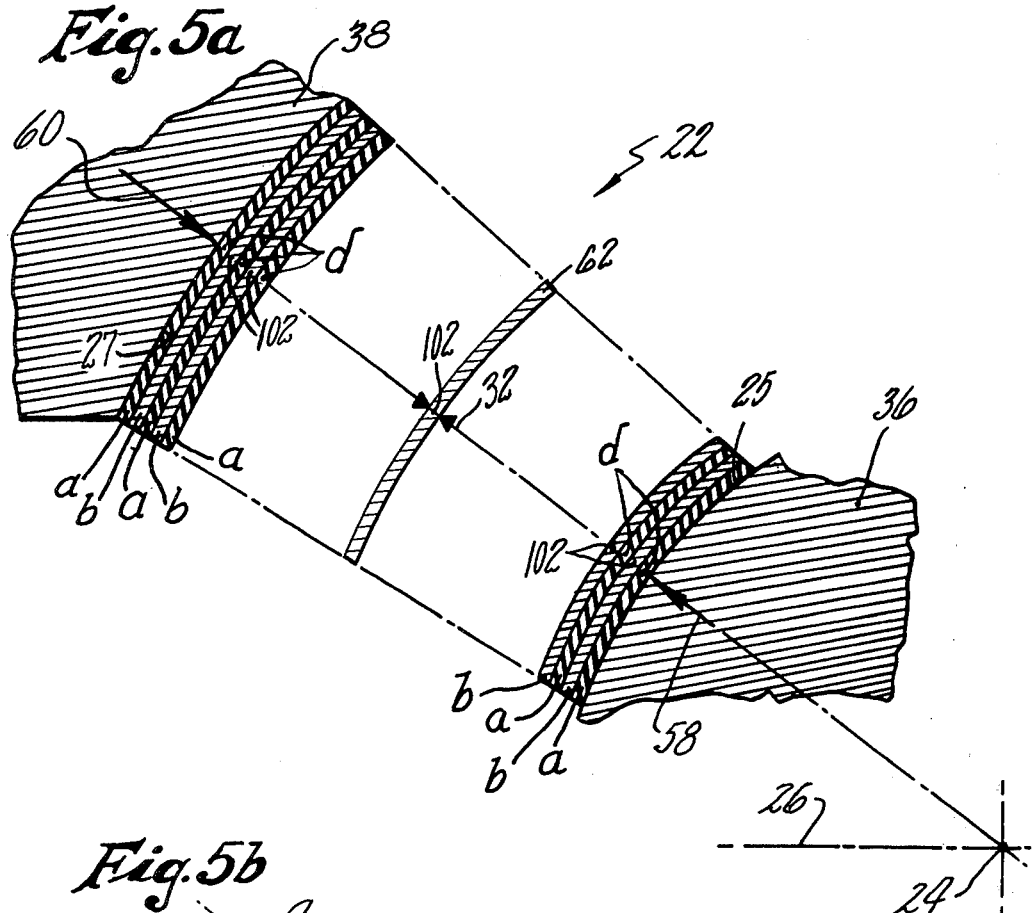
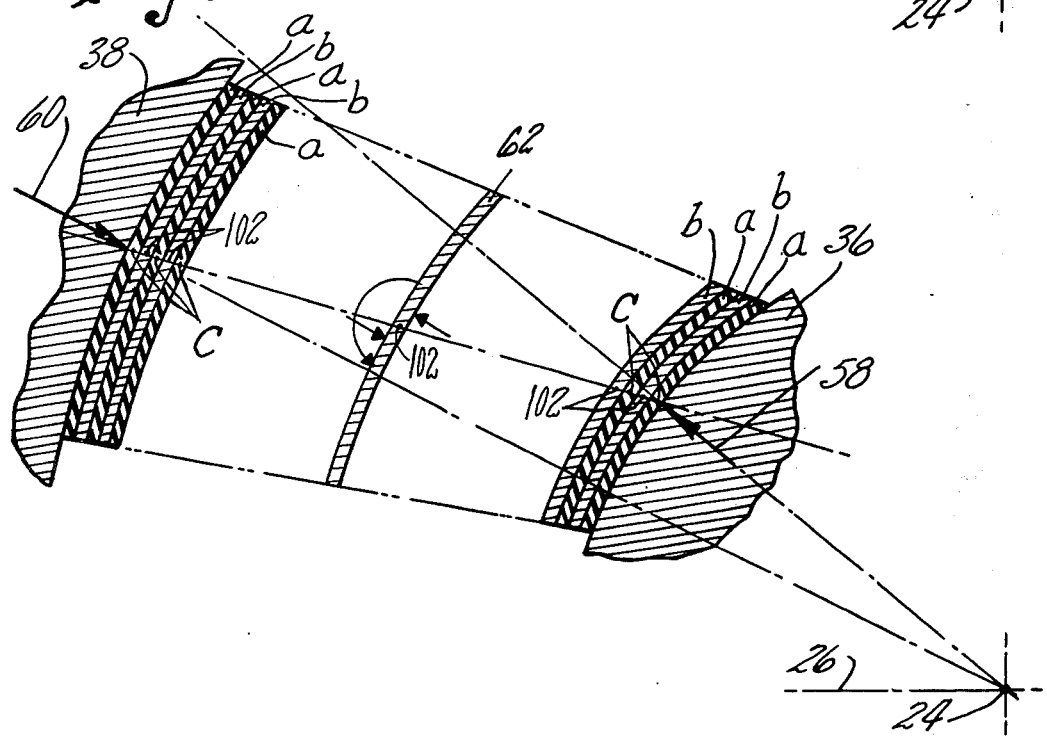

ELASTOMERIC BEARING FOR HELICOPTER ROTOR

This application is a continuation-in-part of application Ser. No. 628,295, filed Nov. 3, 1975, now abandoned.

BACKGROUND OF THE INVENTION

1. Field of Invention

This invention relates to elastomeric bearings and more particularly to elastomeric bearings which are used to support a helicopter blade from a helicopter rotor hub for rotation therewith about an axis of rotation and so that centrifugal loads generated by the blade are passed through the elastomeric bearing to the hub and so that the elastomeric bearing permits the blade to move with respect to the hub in such motions as pitch change, flapping, and possibly lead-lag. The elastomeric bearing may be of the spherical, cylindrical or other types, or combinations thereof.

When elastomeric bearings were first used in helicopter rotors, they were subjected to loads and motions beyond the experience of the art and it was found that elastomeric bearings were not proving to be as durable as had been hoped in the helicopter rotor environment. Our analysis of the problem revealed that the early elastomeric bearings used in rotor heads were failing due to bending and hoop stresses generated in the metallic shims, which caused the shims to rupture and the bearing to fail. Further investigation revealed that, quite surprisingly, these excessive shim stresses were caused by eccentric moments imposed on the shim. Still further analysis revealed that these shim moments were caused by the fact that the load vectors on all shims were not in alignment since the applied load vectors and the load reaction vectors were not in alignment in passing through the elastomeric bearing. This problem and its consequences had not been recognized in the elastomeric bearing industry until our analysis revealed it and solutions to the problem are accordingly not found in the prior art.

2. Description of the Prior Art

In the elastomeric bearing art, the problems of sizing and shaping the bearings so that they can withstand the loads and motions imparted thereto have been addressed, as have the problems of preventing lateral displacement or bulging of the shim stack, however, none of the prior art recognized the problems of excessive shim bending and hoop stresses due to the creation of moments in the shim by failing to keep the applied load vectors and the load reaction vectors, and hence the individual shim load vectors, in alignment in imparting blade centrifugal loads to the hub through the elastomeric bearing.

Hinks U.S. Pat. No. 3,080,065 shows several elastomeric or laminated bearing constructions and suggests constructions which would be laterally stable but does not address the problem of the elimination of laminate moments of concern herein and, in fact, if loads were applied to the Hinks elastomeric bearing construction of FIG. 9 as shown by reference numerals 93 and 94 therein, the laminate moments of concern herein would indeed be established.

Irwin U.S. Pat. No. 3,504,902 addresses itself to achieving lateral or stack stability in an elastomeric bearing by passing pins 23 through the laminates. This Irwin patent does not address itself to the elimination of laminate moments. It should be noted that the stress concentrations which would be created by manufacturing holes in the elastomeric bearing laminates to permit the passing of pins 23 therethrough would be considered structurally undesirable in the helicopter rotor environment.

Wildhaber U.S. Pat. No. 3,752,766 discusses shear stresses in elastomeric bearing laminates but he is merely describing the operation of the conventional elastomeric bearing in which each of the laminates experiences a certain amount of torsional shear motion due to an externally applied rotation, while supporting the total load being passed through the bearing. Wildhaber suggests that in the design of an elastomeric bearing the shear stresses in the elastomeric laminates must not be excessive but does not address himself to the eccentric moments which cause metallic laminate bending and stresses, and therefore does not address himself to the elimination of these moments.

Hinks U.S. Pat. No. 2,900,182 is also primarily directed to columnar or stack stability in an elastomeric bearing and while he shows a spherical bearing in FIG. 8, and cylindrical bearings in FIGS. 4 and 7, he does not address himself to the elimination of laminate moments which will create hoop and bending stresses and hence reduce bearing life. It should be noted that in the Hinks FIG. 4 construction, a centering pin is used to effect lateral or stack stability and some such provision would also be needed in the FIG. 7 construction if that stack were built high enough.

Hinks U.S. Pat. No. 3,228,673 is directed to the problem or providing lateral stability in the laminate column in an elastomeric bearing but does not address itself to the elimination of moments in the laminates and the life reducing hoop and bending stresses which they form therein.

Peterson U.S. Pat. No. 3,292,711 addresses itself to an elastomeric bearing constructed so as to produce column stability. The Peterson patent does not concern itself with the creation of moments in the elastomeric bearing laminates and testing therof demonstrated that endurance reducing laminate eccentric moments were present. It is important to note that column stability is important in an elastomeric bearing and that the elastomeric bearing constructions taught herein achieve column stability without introducing these undesirable eccentric moments in the elastomeric bearing laminates.

SUMMARY OF THE INVENTION

A primary object of the present invention is to provide an improved elastomeric bearing for use in helicopter rotors wherein moments acting upon the shims are eliminated or reduced so as to increase bearing life by reducing metal laminate stresses and elastomer laminate pressure.

In accordance with the present invention, an elastomeric bearing is provided in which the external geometry (shape of the bearing) is so selected and the laminates are so positioned that the center of hydrostatic pressure in each elastomeric laminate cross-section and the cross-sectional center of gravity of each metal laminate are in alignment so that the applied centrifugal force vectors and the centrifugal force reaction vectors, acting across the bearing, are in alignment with each other. In spherical elastomeric bearings, these centers of pressure, cross-sectional centers of gravity and vectors are also in alignment with the bearing pivot point. With the centrifugal force applied vectors and the centrifugal force reaction vectors so aligned, they impose no bending moment on the metal laminates, whereas had these vectors not been aligned, such bending moments would indeed be imposed thereby on the metal laminates.

In accordance with a further aspect of the present invention, laminate bending moments are eliminated in the metal laminates and hydrostatic pressures are reduced in the elastomer laminates while providing stack column stability.

In accordance with still a further aspect of the present invention, metallic laminate bending moments are eliminated and pressures reduced in an elastomeric bearing which is supporting a helicopter blade from a helicopter rotor when the blade is in a selected position with respect to the rotor hub, so that the laminate moments and elastomer pressures experienced in all other blade positions will accordingly be reduced.

The invention permits the supporting of a helicopter blade from a helicopter rotor hub by means of a cylindrical elastomeric thrust bearing which reacts all blade centrifugal loading and which accommodates a portion of the blade pitch change motion with respect to the hub, and a spherical elastomeric bearing which is mounted in series with the thrust bearing and which also reacts the blade centrifugal loading in imparting same to the hub, shares the blade pitch change motion with the cylindrical thrust bearing and accommodates the blade flapping and lead-lag motions between the blade and the hub, and in which column stability is provided for in both the thrust and the spherical bearing, and further in which metal laminate moments are eliminated and hydrostatic pressures in the elastomer laminates are reduced in both the thrust and spherical bearings.

BRIEF DESCRIPTION OF THE DRAWING

FIG. 1 is a cross-sectional, partial showing of a helicopter rotor head illustrating a helicopter blade supported from the rotor hub using elastomeric bearings of the type taught herein.

FIG. 2 is a cross-sectional showing of a prior art spherical elastomeric bearing to illustrate the moment generated therein.

FIG. 3 is a cross-sectional showing of a prior art elastomeric thrust bearing to illustrate the moment generated therein.

FIG. 5a is a cross-sectional illustration of a spherical elastomeric bearing fabricated following the invention taught herein.

FIG. 5b is similar to FIG. 5a and illustrates a spherical elastomeric bearing fabricated other than as taught herein and wherein the locus of points representing the centers of pressure of the hydrostatic pressure pattern generated in each elastomeric laminate and the cross-sectional centers of gravity of the metal laminates are not in alignment with each other and not in alignment with the focal point of the bearing.

DESCRIPTION OF THE PREFERRED EMBODIMENT

Figure 4A:
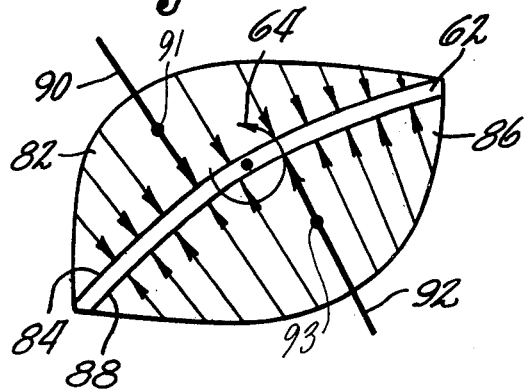
FIG. 4a is a showing of a laminate cross-section illustrating the moment-creating effect experienced by the metal laminate of an elastomeric bearing when acted upon by an unsymmetrical pressure or load pattern wherein the net integrated force vectors acting on opposite sides of the metal laminate are not in alignment.

Referring to FIG. 1 we see elastomeric bearing assembly 10 which serves to support the blade of the helicopter rotor from the rotor hub so as to rotate therewith about an axis of rotation in conventional fashion. The rotor hub 13 includes sleeve member 12 which projects substantially radially from the axis of rotation and envelops the bearing assembly 10. Shaft member 14 extends into sleeve member 12 and may be integrally or otherwise attached to the helicopter blade 16. Shaft member 14 threadably engages nut member 18 so as to cooperate with elastomeric bearing assembly 10 in positioning and supporting the blade 16 from the hub 13. Elastomeric bearing assembly 10 includes cylindrical or annular elastomeric thrust bearing 20 and spherical elastomeric bearing 22 which are positioned and operate in series relationship so that blade 16 is mounted for pivotal or universal motion about pivot or focal point 24, about which spherical bearing 22 is concentric and so that blade 16 may move in pitch change motion with respect to hub 13 about feathering axis 26 which passes through focal point 24. Blade 16 may also flap with respect to hub 13 about a flapping axis which extends into and out of the paper at pivot point 24, and may also move in lead-lag motion about lead-lag axis 28. Spherical bearing 22 consists of inner race 36, with spherical exposed surface 25, outer race with spherical exposed surface 27, and alternate bonded spherical laminates, shims or layers of elastomer and metal or other non-extensible material sandwiched therebetween and with the end laminates being elastomer and bonded to races 25 and 27. All laminates and surfaces 25 and 27 are spherical and concentric about focal point 24. While the term "metal" is used to describe laminates herein, this term is intended to cover any non-extensible laminate material, such as plastic. As will be described in greater particularity hereinafter, it is our teaching that in both thrust bearing 20 and spherical bearing 22, the elastomer and metal laminates are shaped and positioned so that the centers of hydrostatic pressure generated in the elastomer laminate cross-section by centrifugal force loading are in alignment with each other and with the cross-sectional centers of gravity of the metal shim laminates, and so that in the spherical bearing 22 these aligned elastomeric laminate centers of pressure and metal laminate centers of gravity are also in alignment with bearing pivot point 24. In the annular thrust bearing 20, the loci of the centers of pressure acting on each elastomer laminate cross-section and of the cross-sectional centers of gravity of the metal laminates constitute equal diameter circles concentric about feathering axis 26 and that these loci of centers of pressure and cross-sectional centers of gravity also form circles which are concentric about feathering axis 26 for the laminates of spherical bearing 22 when the spherical bearing is centered as shown in FIG. 1.

In FIG. 1, blade 16 is shown in its centered, that is zero flapping and lead-lag position, and operates so that as hub 13 and blade 16 rotate in operation about the helicopter rotor axis of rotation, the centrifugal force generated by blade 16 is transmitted through elastomeric bearing assembly 10 and into sleeve 12 and hub 13 for reaction thereby. The blade generated centrifugal load path is along load line 30 in thrust bearing 20 and along load line 32 in spherical bearing 22.

Elastomeric bearing assembly 10 includes spacer or sleeve member 34 positioned between thrust bearing 20 and spherical bearing 22 which serves to define the inner race 36 of spherical bearing 22, while ring member 38 is the outer race of spherical bearing 22 and is joined to hub sleeve 12 in conventional fashion such as by bolt members 40. Thrust bearing 20 has race member 42 at one end of the laminate stack thereof and race member 44 at the opposite end thereof. As described in greater particularity hereinafter, both thrust bearing 20 and spherical bearing 22 consist of a stack of alternate laminates, shims or layers of elastomer and non-extensible material, such as metal or plastic, with elastomer laminates forming the end laminates and bonded to the bearing races, and with each metal laminate bonded to the adjacent elastomeric laminate. This elastomeric bearing construction takes advantage of the fact that thin layers of elastomer can withstand high compressive loads and have a low shear modulus. Accordingly, the blade centrifugal loading which is being imparted to hub 13 through elastomeric bearing assembly 10 is imparted as compressive loading to both thrust bearing 20 and spherical bearing 22. This construction takes advantage of the capability of elastomer to withstand high compressive loads to retain pivot point 24 in substantially constant position. The low shear modulus of the elastomer is taken advantage of in the FIG. 1 construction in that the various elastomer laminates in thrust bearing 20 and spherical bearing 22 share the total torsional or rotary motion which is required to permit blade 16 to change pitch by rotating with respect to hub 13 about feathering axis 26. Similarly, as blade 16 flaps about the flapping axis and/or hunts about the lead-lag axis 28, the elastomer laminates in spherical bearing 22 share this total motion by each contributing an incremental part thereof.

It is believed that the above description gives sufficient explanation of the operation of the elastomeric thrust and spherical bearing in supporting a helicopter blade from a helicopter rotor but further details with respect thereto may be gained from a reading of Rybicki U.S. Pat. Nos. 3,759,631; 3,759,632; 3,764,230; 3,782,854; 3,829,239; and 3,853,426 to which reference may be made.

Although it had been recognized that elastomeric bearings have the above-described qualities and are therefore suitable for supporting helicopter blades from helicopter rotors, practical experience with elastomeric bearings had been limited to experimental and developmental applications and to helicopters of substantially small size. It is important to note that in the modern helicopter main rotor environment, the elastomeric bearing can be subjected to centrifugal forces of magnitudes up to 100,000 pounds, to periodic pitch change motions of about ± 12°, to periodic flapping motions of about ± 6°, and to periodic lead-lag motions of about ± 2° for a duration of about 40 million cycles. When the development of the present helicopter main rotor was begun, elastomeric bearings capable of withstanding this type of loading and accommodating this type of motion for the required duration were not available to fit within the space and weight envelope of the modern helicopter rotor.

The initial elastomeric bearings built and tested proved to have unacceptable durability, and efforts to increase bearing durability by changes in the elastomer and metal shim materials failed to relieve the problem. The problem persisted until our study revealed that early failure of elastomeric bearings in the helicopter rotor environment were being caused by early failures of the metal laminates, which were failing from what appeared to be a hoop stress failure. Our investigation into what was causing the excessive hoop stresses within the metal laminates brought us to the realization that such hoop stress failures could be caused by eccentric moments being imparted to the metal laminates which would cause laminate bending and create the excessive hoop stresses which were being measured in the laminates. A study of the elastomeric bearings' construction to determine the cause of the high laminate stresses revealed that these early elastomeric bearings, although fabricated by the experts in the field, were constructed in such a way that the centrifugal force generated applied load to the bearing was not in alignment with the centrifugal force reaction load and that this misalignment was causing misalignment of the load vectors within the elastomeric bearing and these misaligned load vectors were establishing bending moments applied to the metal laminates in a direction to create high hoop stresses of such a magnitude that metallic laminate failure resulted.

The significance of the discovery of this problem and the generation of its solution will now be described by first considering the problem as it existed in the prior art.

Referring to FIG. 2, we see spherical bearing 22. FIG. 2 serves to illustrate that the blade centrifugal force, in being imparted through spherical bearing 22 to the hub may be illustrated as vector CF acting against member 34 and through focal point 24, while the blade reaction centrifugal vector R, which must be equal and opposite thereto, may be illustrated as shown. When vectorized, the centrifugal load vector CF may be represented as applied load vector 58, which acts at the center of pressure in the first elastomer laminate, and which passes through focal point 24 and extends in the direction shown so as to act upon the stack of laminates in bearing 22 along the indicated line of action of vector 58. The reaction force R may be vectorized to the illustrated centrifugal load reaction vector 60, which acts at the center of pressure in the last elastomer laminate, and which passes through focal point 24 and acts upon the laminate stack along the indicated line of action of vector 60. It will accordingly be seen that applied load vector 58 and reaction load vector 60 are not in alignment with each other, and that the laminate stack is therefore subjected to the resultant eccentric moment 64. It will further be seen by reference to FIGS. 5b and 4a as discussed hereinafter, that each shim in the laminate stack, such as singularly illustrated metal shim 62, will be subjected to a portion of this resultant eccentric moment and that shim bending and an increase in hydrostatic pressure in the elastomer laminates result from the reaction of this moment. By following the "right-hand rule" and bearing in mind that each metal laminate such as 62, is concentric about feathering axis 26, moment 64 generates tangential loading in the form of hoop stress at the inner and outer periphery, that is, the edge of least and of greatest diameter, in each metal laminate. This metal laminate hoop stress turned out to be sufficiently severe in the original elastomeric bearings that rupture of the metallic laminates occurred and brought about premature failure of the elastomeric bearings.

FIG. 3 illustrates a conventional prior art cylindrical thrust bearing which was used prior to the development of thrust bearing 20 illustrated in FIG. 1 and consists of race members 66 and 68 with the stack of laminates sandwiched therebetween consisting of alternate layers of elastomer laminates 70 and metallic laminates 72. These laminates 70 and 72 were shaped as illustrated in FIG. 3 and the corresponding surfaces 74 and 76 of races 66 and 68 were similarly shaped to provide lateral column stability to the laminate stack so that it would not bulge with respect to feathering axis 26. The blade generated centrifugal force load CF and the reaction force R are illustrated as acting at opposite ends of the bearing and may be represented by blade centrifugal force applied vector 78 which acts at the center of pressure in the first elastomer layer along the indicated line of action, and by centrifugal force reaction vector 80 which acts at the center of pressure in the last elastomer layer along the indicated line of action. It will accordingly be seen that the centrifugal force applied vector 78 and centrifugal force reaction vector 80 are not in alignment with each other and that the laminate stack is therefore subjected to the resultant eccentric moment 81 shown. It will further be seen that each laminate in the laminate stack, such as laminate 72 shown, is subjected to this same moment, since the eccentricity "e" remains a constant dimension, and that shim bending and an increase in elastomer laminate pressure will result from the reaction to this moment. This moment, again, creates the hoop tension or stress previously described to bring about premature failure of the metallic laminates and the overall elastomeric bearings as a result thereof.

It has been noted that the moment imposed upon each laminate in the FIG. 3 construction is substantially the same since dimension e remains constant, however, in the FIG. 2 construction, since load vectors 60 and 58 diverge as their distance from focal point 24 increases, the moment on the laminates of the FIG. 2 construction will increase as their radial distance from focal point 24 increases.

In analyzing the significance of the laminate moment just discussed, we analyzed the load imposed upon each laminate of the elastomeric bearing by integrating the distributed hydrostatic pressure in each elastomer laminate so as to arrive at a net load vector which acts at the center of pressure and which has the same resultant magnitude and direction as the distributed pressure loading acting on each shim.

Considering FIG. 4a as an illustration of unsymmetrical moment creating loading of metal laminate 62 by the elastomeric layers on opposite sides thereof, we see a distributed hydrostatic pressure pattern 82 generated within the adjacent elastomer laminate by the application of centrifugal force across the bearing and being imposed upon the top surface 84 of laminate 62 and a distributed hydrostatic pressure pattern 86 similarly generated within the other adjacent elastomer laminate and being generated against the bottom surface 88 by the application of centrifugal force across the bearing. Pressure distributions 82 and 86 may be integrated into net load vectors illustrated as 90 and 92 acting through respective centers of hydrostatic pressure 91 and 93 of the adjacent elastomeric laminates and upon surfaces 84 and 88, so as to impose moment 64 on metal laminate 62.

Hydrostatic pressure patterns 82 and 86 represent the hydrostatic pressure being built up in the elastomer layers on opposite sides of metallic shim 62 by the application of the blade centrifugal force loading across the elastomeric bearing and these pressure patterns act upon the opposite surfaces of metal elastomer 62. These pressure patterns can be integrated into applied and reaction load vectors 92 and 90 acting through the centers of pressure 93 and 91 of the adjacent elastomeric laminate and on the opposite surfaces of the metal laminate 62, thereby imposing the undesirable moment 64 thereon.

It will be recognized by those skilled in the art that FIGS. 4a, 4b, 5a and 5b are cross-sectional showings of spherical elastomeric bearings which could, for example, be developed by the intersection of a plane therethru which is also coincident with and parallel to the feathering axis. These Figs. show the cross-section of the top half of the spherical bearing.

Figure 4B:
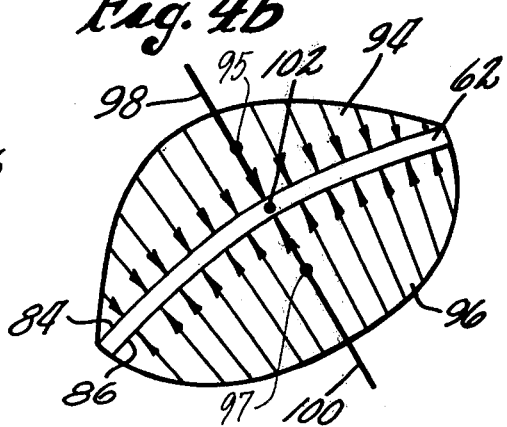
FIG. 4b is similar to FIG. 4a but illustrates the elimination of the moment when the metal laminate is acted upon by a symmetrical load or pressure pattern with aligned load vectors.

Now referring to FIG. 4b we see an illustration of symmetrical, non-moment producing loading of metallic laminate 62 in which a distributed hydrostatic pressure pattern 94, generated within the elastomer laminate adjacent surface 84 of metal laminate 62 by the application of centrifugal force across the bearing during rotor rotation and imposed on the top surface 84 of laminate 62 being resisted by a symmetrical distributed hydrostatic pressure pattern 96 generated within the elastomeric laminate adjacent surface 86 of metal elastomer 62 and acting against surface 86 so as to produce at their respective centers of pressure 97 and 95 integrated net applied load vector 100 and integrated net reaction load vector 98 passing through centers 97 and 95 of the adjacent elastomeric bearing and acting on opposite surfaces 84 and 86 of metallic shim 62. Integrated net load vectors 98 and 100 are equal and opposite and laminate 62 is in equilibrium since the summation of forces and moments about net load point 102 is zero. Shim 62 is loaded simply in compression and no bending results.

Point 102 illustrated at FIG. 4b is the cross-sectional center of gravity of metal laminate 62 and since point 102 is is alignment with the centers of pressure 95 and 97 of the adjacent elastomeric laminates, it will be seen than metallic shim 62 is moment free when the cross-sectional center of gravity of shim 62 is in alignment with the centers of pressure of adjacent elastomer laminates, and that elastomeric bearing stack 20 or 22 is moment-free when the locus of metal laminate cross-sectional centers of gravity is in alignment with the locus of the centers of pressure of the elastomer laminate cross-sections.

The method for determining the location, direction and magnitude of a net applied and reaction load vectors for any distributed pressure loading situation, such as exists between the laminates of an elastomeric bearing, are well known and reference may be made to any standard text on engineering mechanics for a complete explanation thereof. A convenient reference for present purposes is: *Handbook of Engineering Mechanics*, W. Flügge, Ed in chief, 1st edition, McGraw Hill, 1962. As a matter of modern expedience, a computer program would preferably be used to determine the exact pressure distribution and to perform the integration necessary to locate the net applied load vectors. One such computer program which may be utilized for this purpose is the TEXGAP computer code maintained under U.S. Air Force Contract F04611-74-C-0026 with Professor E. B. Becker and R. L. Durham at the University of Texas. This code may be rented or purchased by contacting Dr. Eric B. Becker, Department of Engineering Mechanics, University of Texas, Austin, Texas 78712.

Figure 8:
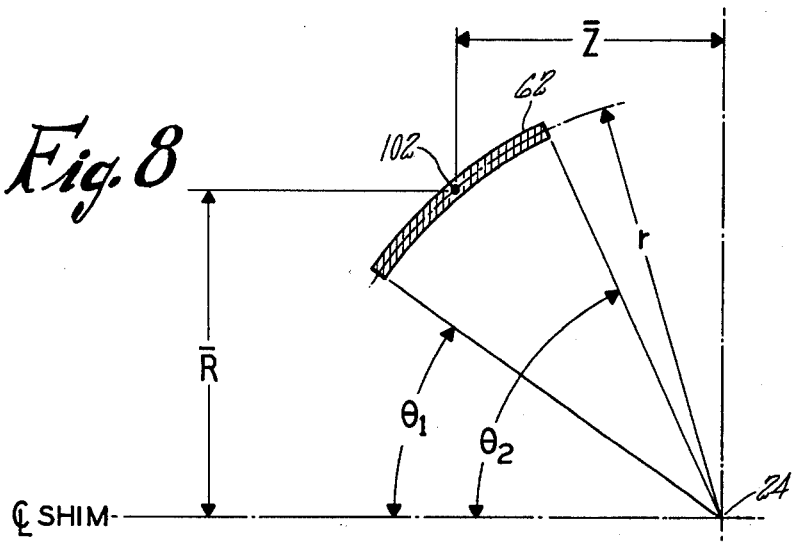
FIG. 8 is a cross-sectional showing of a metallic laminate of the spherical elastomeric bearing to support the equations given herein for determining the cross-sectional center of gravity of that laminate.

The cross-sectional center of gravity for metal laminate 62 may be determined by the following formula (See FIG. 8):

$$\phi_s = 90° - \tan^{-1}\left(\frac{\overline{Z}}{\overline{R}}\right)$$

where:
$\phi_s$ is the angular position of the cross-sectional center of gravity of a non-extensible material shim with respect to the feathering axis or the shim centerline or axis $\overline{R}$ is the radius to local shim cross-section center of gravity from the shim centerline and the feathering axis, and equals $$r\left(\frac{\cos\theta_1 - \cos\theta_2}{\theta_2 - \theta_1}\right)$$

$\overline{Z}$ is the axial dimension from the bearing pivot point to the local shim cross-section center of gravity along the shim centerline and the feathering axis, and equals $$r\left(\frac{\sin\theta_2 - \sin\theta_1}{\theta_2 - \theta_1}\right)$$

r is the mean spherical radius of the non-extensible material shim, $\theta_1$ is the angle from the shim centerline and the feathering axis to the shim inner edge, $\theta_2$ is the angle from the shim centerline and the feathering axis to the shim outer edge.

The cross-sectional center of pressure for elastomer laminate designated as a in FIGS. 5a and 5b may be determined by the following formula which is of the type developed by the above-identified computer service:

$$\phi_E = \sin^{-1}\left(\frac{\Delta}{R}\right)$$

Where:
$\phi_E$ is the angular position of the elastomer laminate cross-sectional center with respect to the feathering axis or the shim centerline or axis, Where:

$$\Delta = \frac{\int_\alpha^\beta [R^2\Phi\sin\psi\tanh^{-1}(\cos\psi) + \lambda R^2\sin\psi + \gamma R^2\cos\psi\sin\psi]d\psi}{\int_\alpha^\beta [R\Phi\tanh^{-1}(\cos\psi) + \lambda R + \gamma R\cos\psi]d\psi}$$

Where: $\gamma = \frac{6G\delta R^2}{t^3}$

-continued $$\Phi = \frac{\gamma(\cos\alpha - \cos\beta)}{(A - B)} \quad \lambda = \frac{\gamma(B\cos\beta - A\cos\alpha)}{(A - B)}$$

$$A = \ln\left(\frac{\cos\beta + 1}{\cos\beta - 1}\right) \quad B = \ln\left(\frac{\cos\alpha + 1}{\cos\alpha - 1}\right)$$

$\delta$ = axial displacement of elastomer layer under load
G = elastomer shear modulus
t = elastomer thickness
P = elastomer pressure
K = elastomer bulk modulus
R = mean radius of elastomer
$\phi_E$ = angular position of elastomer laminate center of pressure with respect to the elastomer laminate centerline and the feathering axis
$\alpha$ = the angle from the elastomer laminate centerline and feathering axis to the laminate inner edge
$\beta$ = the angle from the elastomer laminate centerline and feathering axis to the laminate outer edge
$\psi$ = the general edge which defines the distributed pressure acting on the elastomer laminate at the various stations between its inner and outer edge
$\mu$ = Poisson's ratio of elastomer.

Now applying this technology to spherical bearing 22 of FIG. 1, constructed in accordance with the teaching herein, we refer to FIG. 5a wherein the alternate elastomer and metal laminates, a and b, respectively, are shown selectively shaped and positioned between inner and outer races 36 and 38. An integration of the distributed hydrostatic pressure acting on each elastomer laminate under CF loading acts at point "d" which is the center of pressure in each elastomer laminate. Each elastomeric laminate a acts upon the metal laminates b or race spherical surface on each side thereof so that the pressure pattern integrates into a net applied CF load vector acting through center of pressure d and upon the metal laminate on the hub side thereof and also into a net reaction CF load vector acting through center of pressure d and upon the metal laminate on the blade side thereof. Conversely, each metal laminate b is acted upon by these CF load vectors generated in the elastomeric laminates a located on opposite sides thereof.

It is important to our teaching that metal laminates b, such as 62, are shaped and positioned so that their cross-sectional centers of gravity 102 are also in alignment with each other and with centers of pressure d, and also in alignment with focal point 24. The locus of all points "d" and 102 is therefore a straight line of action 32 passing through focal point 24. Therefore the eccentric moments, laminate bending, and stresses mentioned earlier, which bring about early failure are avoided. If however, a similar analysis is performed on a spherical elastomeric bearing such as shown in FIG. 5b, not constructed as taught herein, it will be seen that the locus of all points "c", which are the centers of pressure of the elastomer laminates and the cross-sectional centers of gravity 102 of the metal laminates, do not form a straight line of action passing through focal point 24. Thus the load transfer between adjacent shims is eccentric and the detrimental effects of the loading moments produced thereby are exhibited as described earlier. In the spherical bearing environment shown in FIG. 5a, the locus of points d and 102 is centrifugal load line 32, and preferably blade centrifugal force applied load vector 58 and blade centrifugal force reaction vector 60 are also in alignment and extending along centrifugal load line 32. If our teaching were applied to the design of an elastomeric bearing of the type shown in FIG. 5b, it would be shown that the net integrated shim load vectors do indeed act at points "c" and are reacted eccentrically, the bearing shape and relative shim position would be modified to either move outer race 38 in a clockwise direction or inner race 36 in a counterclockwise direction, or some combination of both, so as to bring the net integrated shim load vectors and applied CF load vector 58, and CF reaction vector 60 into alignment along a substantially straight line of action passing through focal point 24, thereby eliminating the undesirable shim moments. This alignment of vectors 58 and 60 occurs when, as shown in FIG. 5a, the loci of points d and 102 are common as pass through bearing focal point 24. It will be evident that the locus of points d and points 102 in their respective laminates form a circle concentric about feathering axis 26 when bearing 22 is in its centered position as shown in FIG. 1.

With respect to the elimination of laminate moment of the type encountered in the prior art and shown in FIG. 3 in thrust bearing 20, reference will now be made to FIG. 6 which shows the preferred embodiment of thrust bearing 20. While spherical bearing 22 is concentric about feathering axis 26 when in its zero flapping or centered position shown in FIG. 1, thrust bearing 20 is concentric thereabout at all times since the thrust bearing does not participate in the motion accommodation required for blade flapping and lead-lag motion, but merely serves to share blade pitch change motion with respect to the hub with spherical bearing 22, and is part of the load carrying chain in imparting blade generated centrifugal force to the hub.

Thrust bearing 20 includes end races 42 and 44, having selectively shaped facing surfaces 106 and 108, between which the stack of alternate layers of elastomer laminates 110, and metal laminates 112 are sandwiched. The elastomer of laminates 110 is bonded to race surfaces 106 and 108 and to the surfaces of metal laminates 112. When the integrated net centrifugal load applied and reaction vectors for each shim are in alignment along centrifugal force load line 30, at which time blade centrifugal force applied load vector 114 and blade centrifugal force reaction vector 116 are also in alignment therewith, the undesirable laminate bending moments previously described in connection with FIG. 3 are eliminated from thrust bearing 20. This occurs when laminates 110 and 112 are shaped and positioned so that their domed central positions are symmetrically aligned with line 30 and concentric about axis 26. If the construction of thrust bearing 20 were such that applied load vector 114 or reaction vector 116 were moved upwardly or downwardly from their illustrated positions in FIG. 6, the laminate moments previously described in connection with FIG. 3 would be encountered, since this would bring the net integrated laminate CF applied and reaction load vectors out of alignment with line 30 and bearing column stability would be accordingly reduced.

For the purposes of providing lateral stability about feathering axis 26 to the laminate stack of thrust bearing 20, shims 110 and 112 and race faces 106 and 108 are fabricated so that each has a flat section 118 adjacent its outer diameter, a flat section 120 adjacent its inner diameter joined by a dome-shaped section 122, which is symmetrical about centrifugal force load line 30 and off-set along line 30 with respect to flat surfaces 118 and 120 as illustrated by dimension g.

Figure 6:
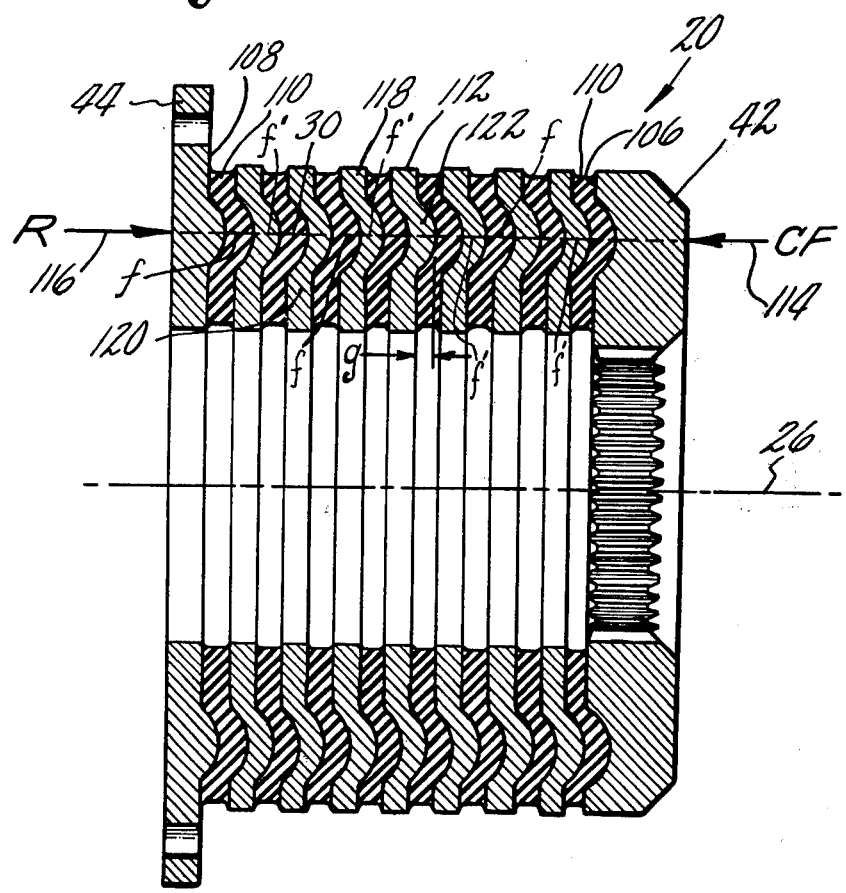
FIG. 6 is a cross-sectional showing of an elastomeric thrust bearing fabricated in accordance with our teaching to produce such a bearing which has column stability and which is free of laminate moments.
Figure 7:
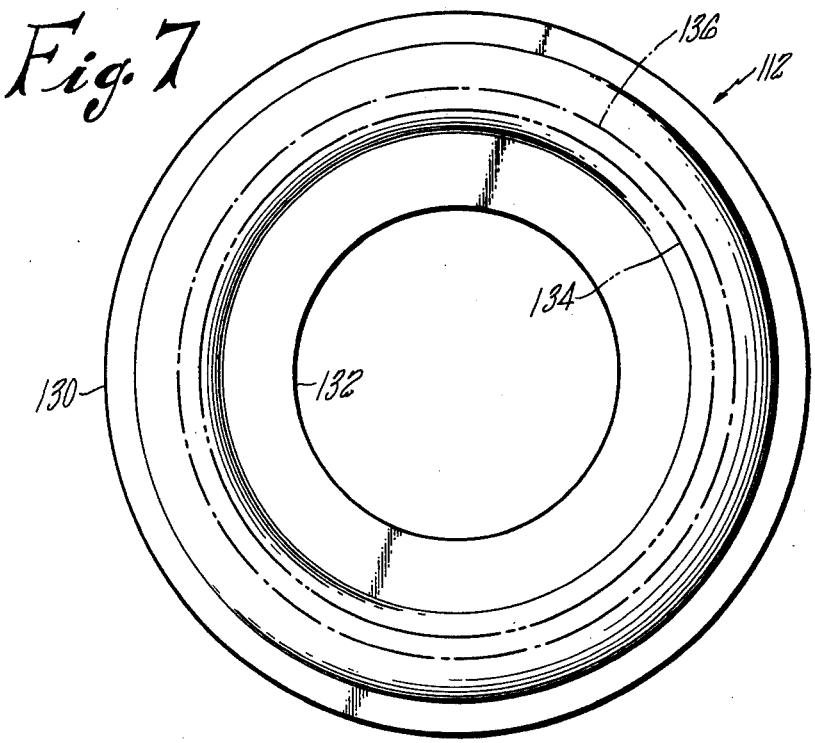
FIG. 7 is a showing of one of the laminates of the FIG. 6 construction to illustrate the mid-area diameter thereof.

It is important to note that the domed portions of the FIG. 6 laminates 110 and 112 and the race exposed end surfaces 106 and 108 are not positioned mid-way between the inner and outer diameters thereof, but are positioned to be concentric about the loci of the centers of pressure f of the elastomer laminates 110 and the cross-sectional centers of gravity f' of the metal laminates 112. Points f and f' lie on the common mid-area diameter of the laminates 110 and 112. This is essential if the shim bending moments of concern are to be eliminated. For a better understanding as to why this is the case, attention is directed to FIG. 7 which illustrates a typical metal laminate 112. It will be noted by viewing FIG. 7, that since laminate 112 is generally disc-shaped having an outer diameter 130 and an inner diameter 132 and a mid-geometric diameter illustrated at 134, that the area of the laminate between diameters 132 and 134 is considerably smaller than the area of the laminate between diameters 134 and 130. Accordingly, a uniform pressure applied to the larger laminate area outboard of diameter 134 will create a greater force on laminate 112 than the same uniform pressure applied to the smaller laminate area inboard of diameter 134. It will therefore be evident that the centers of pressure "f" of the elastomer laminates 110 and the cross-sectional centers of gravity f' of the metal laminates 112, as well as the integrated net centrifugal force applied and reaction load vectors will lie along mid-area diameter 136 where the total force applied outboard will balance the total force applied inboard of this diameter. Accordingly, to avoid the undesired laminate moments, it is essential to position the domed portion of the shims symmetrically about the laminate mid-area diameter 136. At the laminate mid-area or half-area diameter 136, there is an equal area of shim outboard and inboard thereof so that the pressure pattern acting on each laminate will produce applied and reaction integrated net load vectors acting on the laminates which will cancel when they are aligned in passing through the mid-area diameter 136, which establishes line 30 in FIG. 6.

Lateral stability in spherical bearing 22 is provided by the fact that the maximum diameter of spherical bearing 22 about feathering axis 26 is large in comparison to the height or dimension of spherical bearing 22 along feathering axis 26.

While we have shown elastomeric bearing assembly 10 in its zero blade flapping position in FIG. 1 and have chosen that position as the one in which the laminate moments in the thrust bearing 20 and the spherical bearing 22 are to be eliminated or reduced to the greatest practical extent, it is realized that when the blade moves from this zero blade flapping position of FIG. 1, during rotor operation, laminate moments will be generated in spherical bearing 22 as blade 16 either moves in flapping or lead-lag motion, however, the total laminate moment then encountered will be reduced due to the fact that the laminate moments were eliminated or minimized when the blade was in its FIG. 1 zero flapping, zero lead-lag position. Since thrust bearing 20 does not move in flapping and lead-lag motion with spherical bearing 22, its canceled laminate moment will be unaffected by blade flapping and lead-lag motion.

Those skilled in the art will realize that in embodiments where laminate moments are of particular concern when the blade is in a particular position relative to the hub, for example its maximum flapping position, by following the teachings described herein, the laminate moments could be eliminated for the condition where the blade is in that particular position, and laminate moments for other blade positions will accordingly be reduced although will in all likelihood not be eliminated in the FIG. 1 zero blade flapping angle position.

We wish it to be understood that we do not desire to be limited to the exact details of construction shown and described, for obvious modifications will occur to a person skilled in the art.

We claim:

1. In a helicopter rotor comprising:
   (1) a hub mounted for rotation about an axis of rotation,
   (2) at least one blade supported from said hub for rotation therewith,
   (3) means connecting said blade to said hub so that centrifugal force generated by said blade during rotation is imparted therethrough to said hub to be reacted thereby, and further connecting said blade to said hub for pitch change motion with respect thereto about a blade feathering axis and for universal motion with respect thereto about a selected pivot point including:
   (a) an elastomeric bearing having:
      (1) a first ring-shaped race member connected to said blade for motion therewith and having a spherical surface concentric about said pivot point,
      (2) a second ring-shaped race member connected to said hub and having a spherical surface concentric about said pivot point and facing said first race spherical surface,
      (3) alternate ring-shaped laminates of elastomer and non-extensible material sandwiched between said first and second race spherical surfaces and with each laminate being of spherical shape concentric about said pivot point thus connecting said blade to said hub through said elastomeric bearing so that relative motion between said laminates accommodates said pitch change and universal motions between said blade and said hub, and, further so that the blade centrifugal load generated by rotation of said blade is passed therethrough to thereby establish a distributed hydrostatic pressure pattern in each elastomeric laminate which acts upon the race spherical surface and the non-extensible material laminates adjacent thereto and wherein, when said laminates and races are viewed in cross section as defined by any plane coincident with the feathering axis, the pressure patterns integrate into net applied load vectors located at the centers of pressure in each of said elastomer laminate cross-sections and acting upon the blade-side of said non-extensible material laminates and said first race spherical surface, and the pressure patterns also integrate into net reaction load vectors located at the centers of pressure in each of said elastomer laminate cross-sections and acting upon the hub side of said non-extensible material laminates and said second race spherical surface,
   (4) the improvement wherein when said blade is in a zero flapping and zero lead-lag position each of said laminates and race-member spherical surfaces are concentric about the feathering axis and each non-extensible material laminate is shaped and positioned so that the angular position of its cross-sectional center of gravity with respect to the feathering axis is a selected angle $\phi_s$ as defined in the following equation:

$$\phi_s = 90° - \tan^{-1}\left(\frac{Z}{R}\right)$$

Where:
$\overline{R}$ is the radius to local shim cross-section center of gravity from the shim centerline and the feathering axis, and equals $$r\left(\frac{\cos\theta_1 - \cos\theta_2}{\theta_2 - \theta_1}\right)$$

$\overline{Z}$ is the axial dimension from the bearing pivot point to the local shim cross-section center of gravity along the shim centerline and the feathering axis, and equals $$r\left(\frac{\sin\theta_2 - \sin\theta_1}{\theta_2 - \theta_1}\right)$$

r is the mean spherical radius of the non-extensible material shim,
$\theta_1$ is the angle from the shim centerline and the feathering axis to the shim inner edge,
$\theta_2$ is the angle from the shim centerline and the feathering axis to the shim outer edge, so that the cross-sectional centers of gravity of all non-extensible material shims are in alignment with each other and the pivot point, and further so that each elastomer laminate is shaped and positioned so that the angular position of its cross-sectional center of pressure with respect to the feathering axis is a selected angle $\phi_E$ as defined by the following equation:

$$\phi_E = \sin^{-1}\left(\frac{\Delta}{R}\right)$$

Where:

$$\Delta = \frac{\int_\alpha^\beta [R^2\Phi\sin\psi\tanh^{-1}(\cos\psi) + \lambda R^2\sin\psi + \gamma R^2\cos\psi\sin\psi]d\psi}{\int_\alpha^\beta [R\Phi\tanh^{-1}(\cos\psi) + \lambda R + \gamma R\cos\psi]d\psi}$$

Where: $\gamma = \frac{6G\delta R^2}{t^3}$ $\Phi = \frac{\gamma(\cos\alpha - \cos\beta)}{(A - B)} \quad \lambda = \frac{\gamma(B\cos\beta - A\cos\alpha)}{(A - B)}$ $A = \ln\left(\frac{\cos\beta + 1}{\cos\beta - 1}\right) \quad B = \ln\left(\frac{\cos\alpha + 1}{\cos\alpha - 1}\right)$ $\delta$ = axial displacement of elastomer layer under load
G = elastomer shear modulus
t = elastomer thickness
P = elastomer pressure
K = elastomer bulk modulus
R = mean radius of elastomer $\phi_E$ = angular position of elastomer laminate center of pressure with respect to the elastomer laminate centerline and the feathering axis, $\alpha$ = the angle from the elastomer laminate centerline and feathering axis to the laminate inner edge $\beta$ = the angle from the elastomer laminate centerline and feathering axis to the laminate outer edge $\phi$ = the general angle which defines the distributed pressure acting on the elastomer laminate at the various stations between its inner and outer edge $\mu$ = Poisson's ratio of elastomer, and where $\phi_E = \phi_s$ so that the centers of pressure in the elastomer laminate cross-sections and the cross-sectional centers of gravity of the non-extensible material laminates are in alignment with each other and the pivot point to thereby produce aligned net applied and reaction load vectors on opposite sides of each of said non-extensible material laminates and on said race spherical surfaces when the blade is so positioned with respect to the hub.

2. A helicopter rotor according to claim 1 wherein said elastomer laminates are bonded to said non-extensible material laminates and wherein the end laminates are elastomer and bonded to the exposed spherical surfaces of said first and second race members.

3. A helicopter rotor according to claim 2 wherein said hub includes a sleeve-type member and wherein said blade-to-hub connecting means includes a shaft-like member connected to the blade inner end and enveloped within said hub sleeve-type member, and wherein said race members and said laminates envelop the shaft member and are positioned within the hub sleeve-type member.

4. A helicopter rotor according to claim 1 wherein when said blade is in said selected position the locus of cross-sectional centers of pressure in said elastomer laminates and the locus of cross-sectional centers of gravity in said non-extensible laminates form circles concentric about the feathering axis.

5. In a helicopter rotor having an axis of rotation and comprising:
  (1) a hub mounted for rotation about an axis of rotation,
  (2) at least one blade supported from said hub for rotation therewith,
  (3) means connecting said blade to said hub for rotation with respect to said hub about a blade feathering axis and for rotation therewith about the rotor axis of rotation so that centrifugal loads generated by rotation of said blade will be imparted therethrough to said hub and including:
    (a) a cylindrically shaped, elastomeric thrust bearing concentrically enveloping the blade feathering axis and having:
      (1) a first ring-shaped race member concentric about said feathering axis and connected to said blade for motion therewith and having a selectively shaped exposed surface,
      (2) a second ring-shaped race member concentric about said feathering axis, and connected to said hub, and having a selectively shaped exposed surface corresponding to and facing said first race surface,
      (3) alternate ring-shaped laminates of elastomer and non-extensible material concentric about said feathering axis, of corresponding shape to said race member exposed surfaces to provide laminate column stability, and sandwiched between said first and second race member exposed surfaces with each of said elastomer laminates bonded to the race exposed surfaces and non-extensible material laminate adjacent thereto, so that said blade is connected to said hub through said elastomeric thrust bearing and the centrifugal load generated by rotation of said blade is passed to said hub therethrough, further so that the blade centrifugal load generated by rotation of said blade is passed therethrough to thereby establish a distributed hydrostatic pressure pattern in each elastomeric laminate which acts upon the race exposed surface and the non-extensible material laminates adjacent thereto and wherein, when said laminates and races are viewed in cross section as defined by any plane coincident with the feathering axis, the pressure patterns integrate into net applied load vectors located at the centers of pressure in each of said elastomer laminate cross-sections and acting upon the blade-side of said non-extensible material laminates and said first race exposed surface, and the pressure patterns also integrate into net reaction load vectors located at the centers of pressure in each of said elastomer laminate cross-sections and acting upon the hub side of said non-extensible material laminates and said second race exposed surface,
  (4) the improvement wherein said laminates and said first and second race member exposed surfaces are identical and shaped in cross-section so as to have substantially flat edge portions and a central domed portion positioned concentrically about the laminate mid-area diameter, so that the centers of pressure in the elastomeric laminate cross-section and the cross-sectional centers of gravity of the non-extensible laminates are in alignment with each other and wherein the loci of the centers of pressure in each elastomeric laminate and the loci of the cross-sectional centers of gravity in each non-extensible material laminate are equal diameter circles defined by the mid-area diameters of the laminates concentric about the feathering axis to thereby produce aligned net applied and reaction load vectors on opposite sides of each of said non-extensible material laminates.

6. An elastomeric bearing having:
  (1) a first ring-shaped race member having a spherical surface concentric about said pivot point, and an axis passing through said pivot point and about which said first race member and its spherical surface are concentric,
  (2) a second ring-shaped race member having a spherical surface concentric about said pivot point and facing said first race spherical surface an an axis passing through said pivot point and about which said second race member and its spherical surface are concentric,
  (3) alternate ring-shaped laminates of elastomer and non-extensible material sandwiched between said first and second race spherical surfaces and each laminate having an axis passing through said pivot point and about which the laminate is concentric and with each laminate being of spherical shape concentric about said pivot point thus connecting said race members through said laminates so that relative motion between said laminates accommodates motion between said race members, and, further so that a load passed through the elastomeric bearing from said first race member to said second race member is passed therethrough to thereby establish a distributed hydrostatic pressure pattern in each elastomeric laminate which acts upon the race spherical surface and the non-extensible material laminates adjacent thereto and wherein, when each laminate and race is viewed in cross section as defined by any plane coincident with its axis, the pressure patterns integrate into net applied load vectors located at the centers of pressure in each of said elastomer laminate cross-sections and acting upon the blade-side of said non-extensible material laminates and said first race spherical surface, and the pressure patterns also integrate into net reaction load vectors located at the centers of pressure in each of said elastomer laminate cross-sections and acting upon the hub side of said non-extensible material laminates and said second race spherical surface, (4) the improvement wherein when said race member and laminate axes are coincident and pass through said pivot point each of said laminates and race-member spherical surfaces are concentric about the pivot point and each non-extensible material laminate is shaped and positioned so that the angular position of its cross-sectional center of gravity with respect to its axis is a selected angle $\phi_s$ as defined by the following equation:

$$\phi_s = 90° - \tan^{-1}\left(\frac{Z}{R}\right)$$

Where:
$\overline{R}$ is the radius to local shim cross-section center of gravity from the shim axis, and equals $$r\left(\frac{\cos\theta_1 - \cos\theta_2}{\theta_2 - \theta_1}\right)$$

$\overline{Z}$ is the axial dimension from the bearing pivot point to the local shim cross-section center of gravity along the shim axis, and equals $$r\left(\frac{\sin\theta_2 - \sin\theta_1}{\theta_2 - \theta_1}\right)$$

r is the mean spherical radius of the non-extensible material shim,
$\theta_1$ is the angle from the shim axis to the shim inner edge,
$\theta_2$ is the angle from the shim axis to the shim outer edge, so that the cross-sectional centers of gravity of all non-extensible material shims are in alignment with each other and the pivot point, and further so that each elastomer laminate is shaped and positioned so that the angular position of its cross-sectional center of pressure with respect to its axis is a selected angle $\phi_E$ as defined by the following equation:

Where: $\phi_E = \sin^{-1}\left(\frac{\Delta}{R}\right)$ $$\Delta = \frac{\int_\alpha^\beta [R^2\Phi\sin\psi\tanh^{-1}(\cos\psi) + \lambda R^2\sin\psi + \gamma R^2\cos\psi\sin\psi]d\psi}{\int_\alpha^\beta [R\Phi\tanh^{-1}(\cos\psi) + \lambda R + \gamma R\cos\psi]d\psi}$$

Where: $\gamma = 6\dfrac{G\delta R^2}{t^3}$ $\Phi = \dfrac{\gamma(\cos\alpha - \cos\beta)}{(A - B)}$ $\qquad \lambda = \dfrac{\gamma(B\cos\beta - A\cos\alpha)}{(A - B)}$ $A = \ln\left(\dfrac{\cos\beta + 1}{\cos\beta - 1}\right) \qquad B = \ln\left(\dfrac{\cos\alpha + 1}{\cos\alpha - 1}\right)$ $\delta$ = axial displacement of elastomer layer under load
G = elastomer shear modulus
t = elastomer thickness
P = elastomer pressure
K = elastomer bulk modulus
R = means radius of elastomer
$\phi_E$ = angular position of elastomer laminate center of pressure with respect to the elastomer laminate centerline and the feathering axis,
$\alpha$ = the angle from the elastomer laminate centerline and feathering axis to the laminate inner edge,
$\beta$ = the angle from the elastomer laminate centerline and feathering axis to the laminate outer edge,
$\phi$ = the general angle which defines the distributed pressure acting on the elastomer laminate at the various stations between its inner and outer edge,
$\mu$ = Poisson's ratio of elastomer, and where $\phi_E = \phi_S$ so that the centers of pressure in the elastomer laminate cross-section and the cross-sectional centers of gravity of the non-extensible material laminates are in alignment with each other and the pivot point to thereby produce aligned net applied and reaction load vectors on opposite sides of each of said non-extensible material laminates and on said race spherical surfaces when the blade is so positioned with respect to the hub.

7. A cylindrically shaped, elastomeric thrust bearing concentric about an axis and having:

(1) a first ring-shaped race member concentric about said axis and having a selectively shaped exposed surface, (2) a second ring-shaped race member concentric about said axis and having a selectively shaped exposed surface corresponding to and facing said first race surface, (3) alternate ring-shaped laminates of elastomer and non-extensible material concentric about said axis, of corresponding shape to said race member exposed surfaces to provide laminate column stability, and sandwiched between said first and second race member exposed surfaces with each of said elastomer laminates bonded to the race exposed surfaces and non-extensible material laminate adjacent thereto, so that relative rotational motion between said race members is accommodated by relative rotational motion between said laminates and, further, so that a load passed through the elastomeric bearing establishes a distributed hydrostatic pressure pattern in each elastomeric laminate which acts upon the race exposed surface and the non-extensible material laminates adjacent thereto and wherein, when said laminates and races are viewed in cross section as defined by any plane coincident with the feathering axis, the pressure patterns integrate into net applied load vectors located at the centers of pressure in each of said elastomer laminate cross-sections and acting upon the first race member side of said non-extensible material laminates and said first race exposed surface, and the pressure patterns also integrate into net reaction load vectors located at the centers of pressure in each of said elastomer laminate cross-sections and acting upon the second race member side of said non-extensible material laminates and said second race exposed surface, (4) the improvement wherein said laminates and said first and second race member exposed surfaces are identical and shaped in cross-section so as to have substantially flat edge portions and a central domed portion positioned concentrically about the laminate mid-area diameter so that the centers of pressure in the elastomeric laminate cross-section and the cross-sectional centers of gravity of the non-extensible laminates are in alignment with each other and wherein the loci of the centers of pressure in each elastomeric laminate and the loci of the cross-sectional centers of gravity in each non-extensible material laminate are equal diameter circles defined by the mid-area diameters of the laminates concentric about the axis to thereby produce aligned net applied and reaction load vectors on opposite sides of each of said non-extensible material laminates.

* * * * *

UNITED STATES PATENT AND TRADEMARK OFFICE
CERTIFICATE OF CORRECTION

PATENT NO. : 4,142,833
DATED : March 6, 1979
INVENTOR(S) : Robert C. Rybicki and Brian Cuerden It is certified that error appears in the above-identified patent and that said Letters Patent are hereby corrected as shown below:

Column 15, Line 8    "$\phi$"  should be "$\gamma$"

Column 18, Line 31   "$\phi$"  should be "$\gamma$"

Signed and Sealed this

Nineteenth Day of February 1980

[SEAL]

Attest:

SIDNEY A. DIAMOND

Attesting Officer     Commissioner of Patents and Trademarks